United States Patent [19]

Eckhart

[11] 4,114,895

[45] Sep. 19, 1978

[54] PHONOGRAPH TONEARM PICKUP COUNTERBALANCE

[76] Inventor: Lewis Eckhart, P.O. Box 2558, Tallahassee, Fla. 32304

[21] Appl. No.: 819,201

[22] Filed: Jul. 26, 1977

[51] Int. Cl.² ............................................... G11B 3/10
[52] U.S. Cl. ................................................. 274/23 R
[58] Field of Search ................... 274/23 R, 23 A, 1 R

[56] References Cited

U.S. PATENT DOCUMENTS

| 3,156,472 | 11/1964 | Brock ................................. | 274/23 R |
| 3,294,403 | 12/1966 | Reed et al. .......................... | 274/23 R |
| 3,503,615 | 3/1970 | Matsuda .............................. | 274/10 R |
| 3,623,734 | 11/1971 | Sakamoto ............................ | 274/1 R |
| 3,771,797 | 11/1973 | Braun ................................. | 274/23 A |
| 3,830,505 | 8/1974 | Rabinow .............................. | 274/1 R |
| 4,023,130 | 5/1977 | Ridler ................................. | 274/23 X |

FOREIGN PATENT DOCUMENTS 450,752  4/1968  Switzerland .......................... 274/23 R

*Primary Examiner*—Harry N. Haroian
*Attorney, Agent, or Firm*—Dowell & Dowell

[57] ABSTRACT

A low mass counterbalance assembly is provided for the tonearm of a phonograph. The counterbalance assembly includes a leaf spring and magnet that are attached to the tonearm. The magnet interacts with a second magnet attached to the base of the phonograph thereby affecting the downward tracking force of the tonearm stylus. The leaf spring modulates the interaction of the magnets.

11 Claims, 7 Drawing Figures

PHONOGRAPH TONEARM PICKUP COUNTERBALANCE

BACKGROUND OF THE INVENTION

In the past some tonearms have utilized a counterbalance weight in order to control downward or vertical stylus tracking force or have relied upon a combination of a counterbalance weight and a spring to govern this force.

Still others have utilized a combination of magnetic or electromagnetic force, together with a separate counterweight or counterweight and spring combination to control the stylus' vertical tracking force. Examples of the latter are disclosed in the U.S. Pat. Nos. 3,830,606 to Rabinow, 3,623,734 to Sakamoto et al., and the Britain Pat. No. 1,145,865 of 1969.

A problem with tonearms which utilize a counterweight is that this adds to the overall inertial mass of the tonearm. Such mass decreases the ability of the tonearm to change directions in response to unevenness in the horizontal grooved surface of a phonograph record. As a result, the stylus associated with the tone arm tends to gouge the high places in a record surface but fails, or has reduced ability, to track the low places with consequent loss of fidelity.

A tonearm which does not utilize a counterweight and therefore may tend to have a low inertial mass is disclosed in FIG. 5 of the Rabinow patent cited above. The tonearm disclosed is provided with a pneumatic tonearm pressure control. Such apparatus is complex and expensive to manufacture.

Some styli are flexibly attached to their cartridges by means of an elastomer or a spring metal member. Such styli move vertically in response to sound imparting ridges within the groove of a record and also follow slight vertical warpage in the horizontal surface of a record without appreciably affecting the vertical displacement of the associated cartridge and tonearm. In addition the stylus' downward tracking force may remain relatively constant during such slight vertical movement of the stylus.

SUMMARY OF THE INVENTION

The present invention is embodied in a pivoting tonearm for a phonograph in which the tonearm is of the type that requires a counterbalance to control the tracking force of its pickup or cartridge and stylus assembly. The tonearm has a lightweight counterbalance means including a leaf spring located in a position remote from the connection between the cartridge and stylus which cooperates with a pair of magnets for maintaining a relatively constant downward pickup tracking force over a relatively wide range of variations in the vertical displacement of a record surface. One of the magnets is mounted on the leaf spring in spaced vertical relationship to the other magnet and the facing portions of the magnets are of like polarity so that the repelling force of the magnets counteract the bias of the leaf spring. This arrangement permits substantial vertical movement of the tracking end of the tonearm while the magnets remain a substantially fixed distance apart so that the magnetic or counterweight force remains substantially constant.

It will be understood that the magnet and spring arrangement eliminates the need for a heavy counterweight, thus substantially lowering the total mass of the tonearm and reducing the moment of inertia of the tonearm in both the vertical and horizontal planes of movement thereof.

An object of the present invention is to provide a combination spring and magnet apparatus which substitutes for the heavier counterweight devices used in the past, wherein a magnet, itself, functions as a lightweight counterweight, a magnetic field interacts with the magnet, and a spring modulates the effect of the magnetic interaction to influence the force exerted by the apparatus upon a tonearm.

DESCRIPTION OF THE PREFERRED EMBODIMENTS

Figure 1:
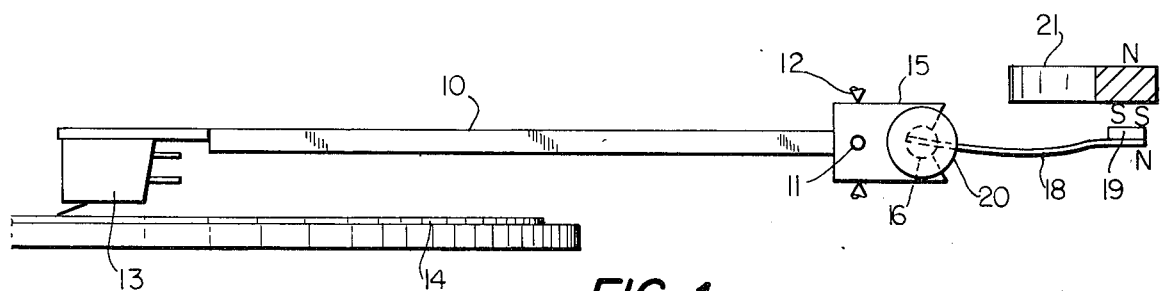
FIG. 1 is a side elevation of one embodiment of the invention.
Figure 2:
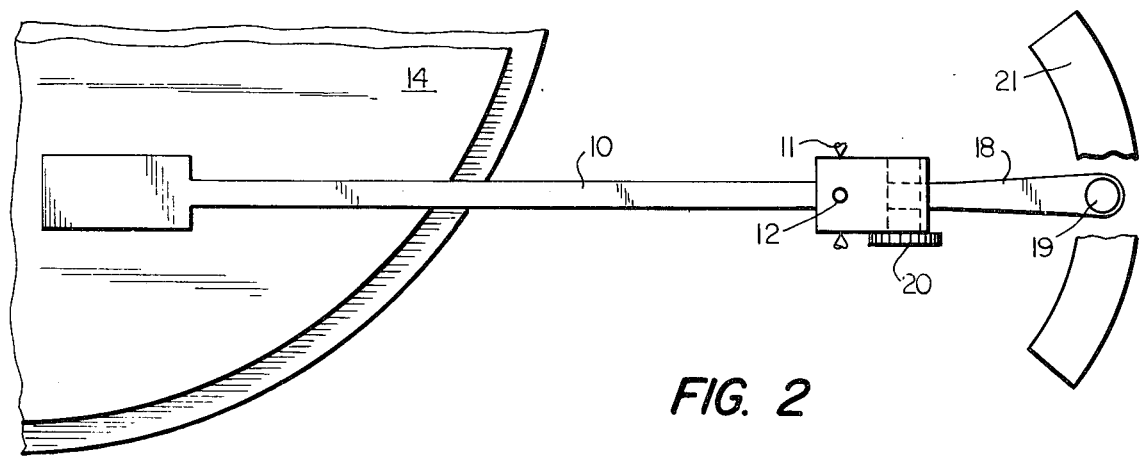
FIG. 2 is a top plan view thereof.

With reference to FIGS. 1 and 2, the drawings disclose portions of a phonograph. A tonearm or support arm 10 is pivotally mounted on a base (not shown) for vertical movement around a pair of pivot points 11 and for horizontal movement around pivot points 12. A cartridge and stylus unit or pickup unit 13 is attached to one end of the tonearm. The pickup unit tracks a record 14 or other recorded information carrier mounted on the base of the phonograph record player.

The end of the tonearm opposite the end carrying the pickup unit 13 fits into one end of a gimbal 15 that engages the pivot points 11 and 12. The other end of the gimbal 15 has a recess 16 which frictionally retains a pivot shaft 17.

One end of a non-magnetic elongated leaf spring 18 is retained in a horizontal slot formed in the side of the shaft 17. The opposite end of the leaf spring 18 carries a disc magnet 19 one face of which is adhered to the flat upper surface of the leaf spring.

A knob 20 is preferably attached to one end of the pivot shaft 17 in order to facilitate manual rotational movement about the horizontal axis of the pivot shaft, leaf spring and disc magnet assembly.

A curved bar magnet 21 is attached to the base (not shown) of the phonograph and is mounted so that the length of the magnet lies in a horizontal plane spaced above the disc magnet 19 and the curve of the magnet is located above the arcuate path to be followed by the disc magnet 19 when the tonearm 10 pivots around the horizontal pivot points 12 as a record is being played.

The upper and lower faces of the magnets are of opposite polarity and the magnets are positioned so that like poles of each magnet are facing towards each other. Thus the magnets exert repelling forces against one another when brought into close proximity.

The portions of the gimbal 15 and attached parts which are located on the opposite side of pivot points 11 from the pickup side of the tonearm assembly function as lightweight counterweights. In particular, the disc magnet 19 located relatively far from the pivot points 11 is a lightweight counterweight for the tonearm 10.

Figure 3:
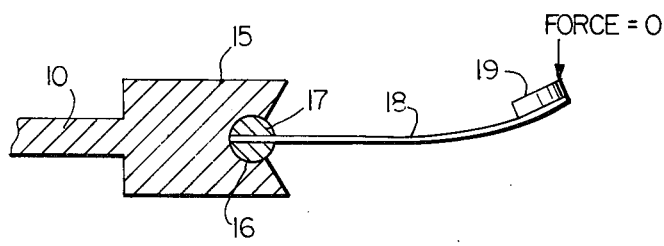
FIG. 3 is an enlarged fragmentary side elevation, partly in section, illustrating the spring of FIG. 1 in a curved configuration.
Figure 4:
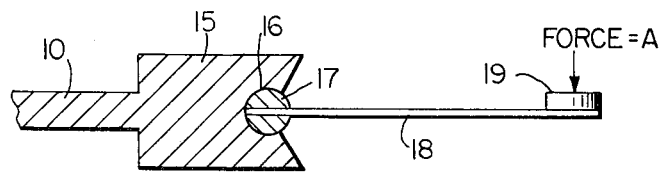
FIG. 4 is a view like FIG. 3 showing the spring in a straightened condition responsive to a force A.

FIG. 3 discloses the curved shape of the leaf spring 18 incorporated into the memory of the spring. The downward force "A" required to cause the upwardly curved spring to assume the straight-line configuration of FIG. 4 is the amount of force necessary to cause the tonearm 10 to assume a balanced horizontal position.

In use, when the described assembly, including all of the above described elements, are mounted on a phonograph base, it is necessary to first set the tracking force of the pickup unit 13. If the tonearm is positioned horizontally, with the leaf spring 18 constrained to assume a straight line shape, the tonearm will hold the pickup 13 in a horizontal balanced position with zero tracking force against the record 14. Therefore in order to bring the pickup 13 downwardly into contact with the surface of the record 14 and to give the pickup a slight tracking force it is necessary to rotate the knob 20 clockwise.

During such rotation, the leaf spring 18 moves from a straight line, zero force configuration of FIG. 3, to a curved configuration as shown in FIG. 1. The clockwise rotation of the knob 20 decreases the downward force acting upon the end of the leaf spring 18 which carries the disc magnet 19 and results in an offsetting increase in the tracking force of the pickup 13 located at the opposite end of the tonearm 10. As the pickup 13 moves toward the surface of the record 14, the magnets 19 and 21 remain spaced apart a substantially constant distance.

During operation of the phonograph, if the record 14 is warped so as to vertically displace the pickup 13, the leaf spring 18 and the magnets 19 and 21 function to aid the pickup unit 13 and its associated stylus in tracking the record groove. Thus when the pickup unit encounters a rise in the surface of the record 14, the pickup 13 will cause the counterweight portion of the tonearm to pivot downwardly around the vertical pivots 11.

This permits the leaf spring 18 to curve upwardly and carry the disc magnet towards the curved bar magnet, counteracting any tendency of the disc magnet 19 to move away from the bar magnet 21, and maintains the tracking force substantially constant. Only very slight changes in the tracking force of the pickup will occur as a function of the changing reaction forces of the leaf spring 18 as it changes its curved configuration.

When there is a relatively large rise in the surface of the record 14, the leaf spring 18 will curve or bend only so far as the spring memory permits, as shown, for example, in FIG. 3. Should the front end of the tonearm assembly continue to pivot upwardly in following the rise in the record 14, then the disc magnet 19 will begin to move away from the curved bar magnet 21. As a result, the magnetic repulsion forces between the magnets will decrease proportional to the square of the distance between the magnets and the uncompensated tracking force of the end of the tonearm carrying the pickup unit will rapidly increase. This will, however, aid the pickup unit in tracking a high rise in the record surface.

When the pickup unit 13 encounters a descending slope in the surface of the record 14, the tonearm 10 pivots to move the pickup 13 downwardly around the pivot points 11. This causes the leaf spring 18 to change its shape from a relatively more curved configuration to a relatively straight configuration while maintaining the magnets 19 and 21 at a relatively fixed separation.

The primary purpose of the counterbalance system described is to lower the total mass of the tonearm by eliminating the need for a separate heavy counterweight as used in the past. In order to reduce the moment of inertia of the tonearm to a minimum, the length of the leaf spring 18 is reduced so that the counterbalance is located as close as practical to the tonearm pivot points 11 and 12. In a pivot type tonearm such as that just described, the moment of inertia is approximately the same in both the horizontal and vertical planes of tonearm movement and has been lessened for movement of the tonearm in either of these planes.

In order to promote a relatively even distribution of the magnetic field acting on the end of the tonearm 10, it is desirable that the disc magnet 19 be rather small in size compared to the curved bar magnet 21 and that the normal gap between the magnets also be relatively small. In some cases it may prove desirable to construct the spring from non-magnetic material to avoid significant distortion of the magnetic field.

In actual practice a selection of spring and magnet combinations would be provided to cover anticipated cartridge and tonearm weights with the springs being less stiff for lighter weight cartridges.

It should also be noted that it would be possible to replace the flat curved bar magnet 21 with an electromagnet. If such were the case, the electromagnet would be mounted in order to precisely follow the travel of the disc magnet when the tonearm 10 pivots around the horizontal pivot points 12.

Figure 5:
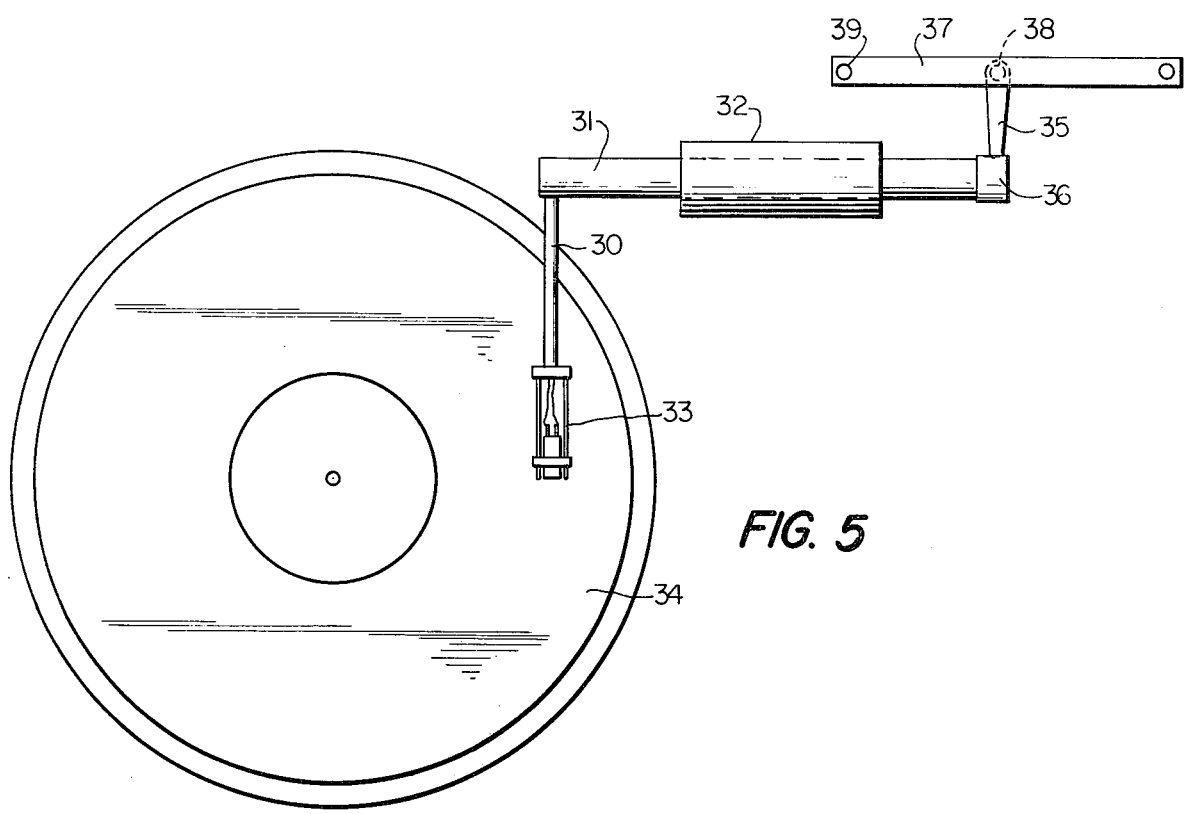
FIG. 5 is a top plan view of a second embodiment of the invention adapted for use with a tonearm that moves in a straight line.

FIG. 5 indicates an application of the invention to a straight-line tracking air-bearing tonearm arrangement. This apparatus includes a tonearm 30 which carries at one end a pickup 33. The pickup 33 follows the grooves on a recorded transmission surface such as the record 34, which is rotatably mounted on the base B of a phonograph. The end of the tonearm 30 opposite the pickup unit 33 is attached at one end of a generally horizontal spindle 31. The spindle is journaled through a generally horizontally positioned tubular air bearing 32 which is attached to the base B of the phonograph. The spindle 31 permits the pickup unit 33 and tonearm 30 to move vertically with respect to the horizontal surface of the record 34. In addition, the spindle 31 is adapted to slide or move horizontally through the tubular air bearing 32 as the pickup unit 33 moves from the outer periphery of the record 34 towards the center of the record.

Figure 6:
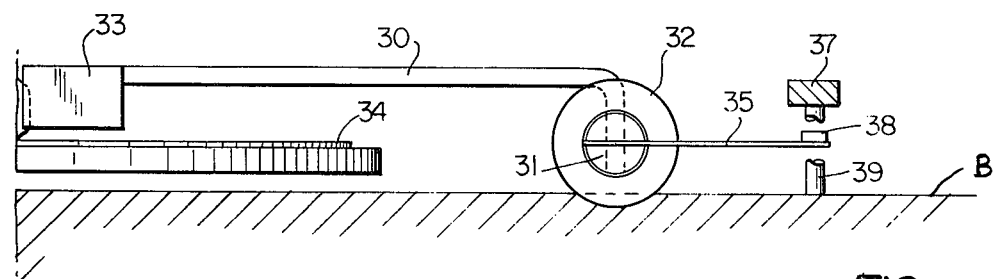
FIG. 6 is an enlarged elevation, partly in section, of the embodiment of FIG. 5.

The end of the spindle 31 remote from the end where the tonearm 30 is connected is provided with means for movably mounting a leaf or flat spring 35. One end portion of the leaf spring 35 is joined to a band 36 and the band 36 is inserted over the end of the spindle 31 and is frictionally retained in place. As shown in FIGS. 5 and 6, the leaf spring 35 extends away from the pivot axis of the spindle in a direction generally opposite from the direction in which the tonearm 30 extends from the pivot axis of the spindle 31. The band 36 may be manually rotated relative to the spindle 31 in order to swing the leaf spring 35 around the axis of the spindle in setting the tracking force of the pickup 13.

A straight bar magnet 37 is mounted on the base of the phonograph and positioned so that it is spaced above the end of the leaf spring 35 remote from the point where the leaf spring is connected to the spindle 31. A disc magnet 38 is attached to this remote end of the leaf spring 35 and is positioned below and in spaced relation to the fixed bar magnet 37. The bar magnet 37 may be attached to the base of the phonograph in any desired manner, as for example, by non-magnetic pin supports, as indicated generally at 39. The supports may be located at opposite ends of the bar magnet 37 as indicated in the drawings.

Figure 7:
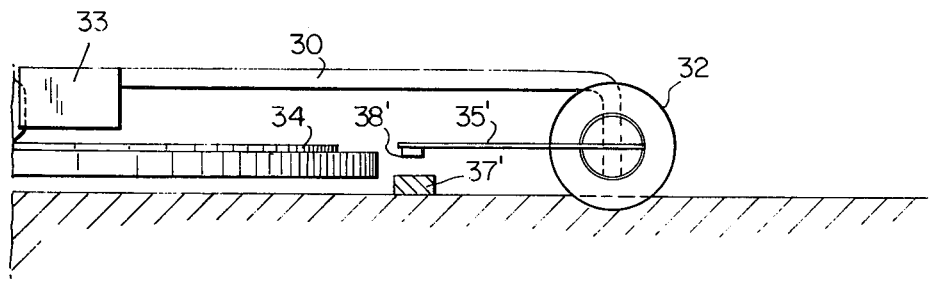
FIG. 7 is a modification of the FIG. 6 embodiment wherein the spring magnet assembly is located on the same side of the support arm pivot as the pickup.

The embodiment of the invention shown in FIG. 7 is similar to the embodiment of FIGS. 5 and 6, except that the leaf spring 35', the straight magnet 37' and the disc magnet 38' are located on the same side of the spindle 31 axis as the pickup 33. This enables the straight magnet 37' to be placed directly on the base surface of the phonograph rather than in spaced relation to the base.

The operation of the embodiment of the invention as disclosed in FIGS. 5-7 is similar to the operation of the embodiment of the invention disclosed with reference to FIGS. 1-4.

In the straight-line tracking tonearm embodiments just described, the total mass of the tonearm has been reduced by removing the need for a heavy counterweight. As in the case with the pivot type tonearm described with reference to FIGS. 1-4, the moment of inertia of the straight-line tonearm 30 as it moves through a vertical plane has been reduced by locating the counterbalance apparatus as close as practical to the tonearm pivot axis around the axis of the spindle 31. In addition, by reducing the total mass of the tonearm assembly, the instant invention achieves a reduction in the inertial mass of the tonearm assembly in the horizontal plane of motion.

As in the case with the pivot type tonearm of FIGS. 1-4 described above, the leaf spring 35 will assume a curved configuration under zero force conditions but a straight-line configuration when maintaining the pickup 33 in a balanced position with zero tracking force. In addition, for reasons discussed with reference to the pivot type tonearm of FIGS. 1-4, the length of the leaf spring 35 is kept to a minimum, and the apparatus is designed for an even distribution of the magnetic field acting on the tonearm 30.

As an example of an embodiment of the invention, modern phono cartridges weigh from 3 to 15 grams (the trend is to make them as light as possible) so typically one might have a center of mass (cartridge weight plus the weight of the supporting lever arm) located approximately 5 inches from the axis of rotation in the vertical plane and weighing 15 grams. This presents a torque of 75 inch grams. If the effective distance from the axis of rotation, including the spring supporting the disc magnet is, for example, 2.5 inches, then the opposing magnets (bar and disc) must exert a force of not less than 30 grams, and the spring would be designed so that it would flex to an approximately flat position under a force of 30 grams. Suitable dimensions for the leaf spring would be ¼ inch to ½ inch in width and from 0.003 to 0.008 inches in thickness.

I claim:

1. In a record player turntable having a base, a record carrier movably mounted on the base, a pickup arm means, means on the base for mounting the pickup arm means for horizontal and vertical movement relative to the base, a pickup device mounted adjacent one end of the pickup arm means remote from the mounting means, the improvement comprising, first magnetic means, means for resiliently mounting said first magnetic means adjacent the other end of the pickup arm means, second magnetic means mounted on the base, said first magnetic means being movable relative to said second magnetic means and being vertically spaced relative thereto, each of said first and second magnetic means having opposed face portions of like polarity, whereby the relative polarity of said first and second magnetic means exerts a force on said other end of the pickup arm means.

2. The invention of claim 1 in which said means for resiliently mounting said first magnetic means includes a leaf spring means having first and second end portions, said first end portion of said spring means being mounted on said other end of said pickup arm which is remote from the pickup device so that said spring means extends outwardly therefrom and said first magnetic means is mounted adjacent said second end portion of said spring means.

3. The invention of claim 2 in which said second end portion of said spring means which carries said first magnetic means is curved upwardly, and said second magnetic means is mounted above said first magnet means.

4. The invention of claim 3 in which said second magnetic means is of substantial lateral extent whereby a portion thereof is positioned above said first magnetic means as said first magnetic means moves laterally.

5. The invention of claim 2 in which said other end of said pickup arm means includes a recess, shaft means adjustably mounted with said means, and said first end of said spring means is mounted in said shaft means.

6. The invention of claim 1 in which said first magnetic means is of a weight that partially counterbalances the pickup arm.

7. The invention of claim 1 in which said pickup arm means includes a tonearm and a generally horizontal spindle means having first and second end sections, said tonearm being mounted adjacent said first end section of said spindle means and said means for resiliently mounting said first magnetic means is disposed adjacent said second end of said horizontal spindle.

8. The invention of claim 7 in which said means for resiliently mounting said first magnetic means includes adjustable band means disposed about said horizontal spindle means and a spring means with first and second ends, said first end of said spring means mounted on said band means so that said spring means is disposed outwardly from said spindle means, and said first magnetic means is mounted adjacent said second end of said spring means.

9. The invention of claim 8 in which said second magnetic means is mounted so as to be positioned above said first magnetic means.

10. The invention of claim 8 in which said first magnetic means is disposed above said second magnetic means.

11. A turntable apparatus comprising a base, a recorded information carrier movably mounted on said base, support arm means pivotally mounted on said base and having stylus means for contacting said carrier, a first magnet mounted on said base, a second magnet, means for resiliently mounting said second magnet to said support arm means extending generally outwardly therefrom and horizontally to said support arm means, said second magnet being generally vertically spaced relative to said first magnet, and said first and second magnets having opposing faces of like polarity.

* * * * *